United States Patent [19]
Epple et al.

[11] Patent Number: 5,359,001
[45] Date of Patent: Oct. 25, 1994

[54] POLYMER BLENDS OF CYCLOOLEFIN POLYMERS AND POLYOLEFINS

[75] Inventors: Ulrich Epple, Eschborn; Michael-Joachim Brekner, Frankfurt am Main, Fed. Rep. of Germany

[73] Assignee: Hoechst Aktiengesellschaft, Frankfurt am Main

[21] Appl. No.: 49,980

[22] Filed: Apr. 20, 1993

[30] Foreign Application Priority Data

Apr. 22, 1992 [DE] Fed. Rep. of Germany ....... 4213219
Dec. 5, 1992 [DE] Fed. Rep. of Germany ....... 4241001

[51] Int. Cl.$^5$ .............. C08L 45/00; C08L 53/00; C08L 23/04; C08L 23/10
[52] U.S. Cl. .......................... 525/97; 524/505
[58] Field of Search ..................... 525/97, 210

[56] References Cited

U.S. PATENT DOCUMENTS

| | | | |
|---|---|---|---|
| 4,533,700 | 8/1965 | Mizui et al. | 525/97 |
| 4,918,133 | 4/1990 | Mouya et al. | 525/97 |
| 5,087,677 | 2/1992 | Brekner | 526/160 |
| 5,180,767 | 1/1993 | Sakai et al. | 525/97 |
| 5,204,429 | 4/1993 | Kaminsky et al. | 526/281 |
| 5,218,049 | 6/1993 | Yamamoto et al. | 525/97 |
| 5,232,993 | 8/1993 | Winter et al. | |

FOREIGN PATENT DOCUMENTS

| | | |
|---|---|---|
| 0433986A2 | 6/1991 | European Pat. Off. |
| 214137 | 10/1984 | Fed. Rep. of Germany |
| 214623 | 10/1984 | Fed. Rep. of Germany |
| 3835044 | 4/1990 | Fed. Rep. of Germany |
| 2269752 | 5/1990 | Japan |

OTHER PUBLICATIONS

English language chemical abstracts summary vol. 102: 150390.
English language chemical abstracts summary vol. 103: 142891.
English language chemical abstracts summary vol. 113: 116078.

*Primary Examiner*—Carman J. Seccuro, Jr.
*Attorney, Agent, or Firm*—Curtis, Morris & Safford

[57] ABSTRACT

For producing 100 parts by weight of a polymer blend 0 to 95 parts by weight of a finely divided polyolefin, 0 to 95 parts by weight of finely divided cycloolefin polymer and 0.1 to 99 parts by weight of a blockpolymer (which consists of monomeric units derived from norbornen and monomeric units derived from aliphatic monocycloolefins $C_nH_{2n}$ and/or aliphatic 1-olefin, such as ethylene or propylene, are mixed and the mixture is processed under heat and shear forces. The block copolymer acts as phase mediator and contains in different blocks different proportions of the monomer units used.

17 Claims, No Drawings

POLYMER BLENDS OF CYCLOOLEFIN POLYMERS AND POLYOLEFINS

Cycloolefin polymers are a class of polymers with an outstanding property spectrum, having in some cases, inter alia, good heat resistance, transparency, hydrolytic stability, low water uptake, good weathering resistance and high rigidity. They are hard, brittle thermoplastics.

It is known that cycloolefins can be polymerized by means of various catalysts. Depending on the catalyst, the polymerization proceeds via ring opening (U.S. Pat. No. 3,557,072, U.S. Pat. No. 4,178,424) or with scission of the double bond (EP-A-156 464, EP-A-283 164, EP-A-291 208, EP-A-291 970, DE-A-3 922 546).

Cycloolefin polymers are insufficiently resistant to impact and shock stress. It is generally known that the resistance to shock and impact stress is good in the case of polyolefins such as polyethylene, polypropylene and 1-polybutene. However, these polyolefins have a limited heat resistance, low strength, a low modulus and low hardness.

It is known that 1-olefins such as ethylene and propylene can be polymerized by means of various catalysts to form polyolefins, in particular polyethylenes and polypropylenes (DE 3 620 060, EP 399 348, EP 086 644, EP 185 918, EP 387 690).

Polyethylene can also be prepared by free-radical polymerization (U.S. Pat. No. 3,336,281). The resultant product is a low density material (LDPE), compared to the material that has been catalytically prepared, which is of high to medium density (HDPE, MDPE). The same is true of copolymers of ethylene with 1-olefins (LLDPE).

It is generally known that important properties of polymers, such as the aforementioned properties, can be modified if polymers are blended with other polymers. For instance, the patent specifications DD 214 137 and DD 214 623 describe thermoplastic structural materials based on polyolefins that simultaneously have a good heat resistance, resistance to chemicals, rigidity, toughness and very good dielectric properties. They contain as essential constituents norbornene-ethylene copolymers and polyethylene or branched polyolefins, if necessary with the addition of stabilizers, lubricants, elastomers, thermoplastics and reinforcing agents. Elastomers such as elastomeric ethylene copolymers and terpolymers or graft copolymers are added to improve the impact strength and notched impact strength. However, block-type copolymers or terpolymers of ethylene or 1-olefins and cycloolefins are not mentioned as elastomers.

According to the above documents additions of polyethylene or branched polyolefins to ethylene-norbornene copolymers lead to an improvement in the resistance to chemicals and toughness of the norbornene-ethylene copolymers. Conversely, the addition of norbornene-ethylene copolymers to polyethylene or branched polyolefins led to an increase in the strength, modulus and hardness, without resulting in any decrease in the impact flexural strength.

Furthermore, it is known that polyolefin thermoplastic combinations of 40 to 98% by weight of crystalline polyolefin and 2 to 60% by weight of a random cyclic olefinic copolymer (glass transition temperature 70° to 210° C., crystallinity 0 to 5%) have a good heat resistance and crack resistance combined with low shrinkage (JP 1 318 052). According to Japanese Patent Application JP 3 122 148 cycloolefin polymer combinations of polymers of the cyclic olefin and crystalline polyolefins have an improved melt processability.

U.S. Pat. No. 4,990,559 describes a thermoplastic combination of 5 to 90% by weight of linear polyolefin (comprising 8 to 40% of ultrahigh molecular weight polyolefin ($\eta$ 10 to 40 dl/g) and 60 to 92% by weight of low to high molecular weight polyolefin ($\eta$ 0.1 to 5.0 dl/g)) and 95 to 10% by weight of at least one cycloolefin thermoplastic selected from ring-opening polymers and ring-opening copolymers.

A blending of cycloolefin copolymers with polyolefins such as polyethylene, polypropylene, 1-polybutene, 1-polyhexene, poly(4-methyl-1-pentene), inter alia, is attractive since such polyolefins are relatively cheap and the corresponding blends then also offer cost advantages. It is then important to achieve as favorable a property combination as possible in the blend, utilizing the cost advantages. Such blends are mainly suitable for applications where good material properties are required.

It is an object of the present invention to provide a process in which, starting from favorable combinations of cycloolefin polymers, polyolefins and additives, polymer blends are obtained having as broad a range of material properties as possible, in particular strength, hardness, heat resistance and toughness.

It is also an object of the present invention to obtain, starting from the individual components, i.e. polyolefins or cycloolefin polymers (including cycloolefin copolymers), by means of additions blends having good material properties.

This invention provides a process for preparing a polymer blend comprising (i) combining at least one of (A) a finely particulate cycloolefin polymer, and (B) a finely particulate polyolefin, with (C) at least one block copolymer, to form a mixture; and (ii) processing the mixture at an elevated temperature, under the action of shear forces, to form the polymer blend, wherein:

in the polymer blend, (A) is present in an amount of 0 to 95 parts by weight, (B) is present in an amount of 0 to 95 parts by weight, (C) is present in an amount of 0.1 to 99 parts by weight and, the sum of the amounts of (A), (B) and (C) present is 100 parts by weight;

the finely particulate cycloolefin polymer (A) comprises at least one monomer of formula I, II, III, IV, V and VI and at least one monomer of formula VII and VIII, but said cycloolefin polymer is not a block copolymer;

the block copolymer (C) is obtained by polymerizing:

a) 0.1 to 95% by weight, with respect to the total amount of monomers employed, of at least one monomer of the formula I, II, III, IV, V and VI, b) 0 to 95% by weight, with respect to the total amount of monomers employed, of a cycloolefin of the formula VII,, and c) 0 to 99% by weight, with respect to the total amount of monomers employed, of at least one acyclic olefin of the formula VIII, at a temperature of $-78°$ to $150°$ C. and a pressure 0.01 to 64 bar, in the presence of a catalyst comprising a cocatalyst and a metallocene, and at a molecular weight distribution $M_w/M_n$ of less than 2, always with respect to the polymer block forming, the reaction conditions are changed one or more times in such a way that the monomer/comonomer ratio changes by at least 10% or a further polymerizable monomer of the formulae I-VIII is metered into the monomer or the monomers; and the monomers of the formula I, II, III, IV, V, VI, VII and VIII are:

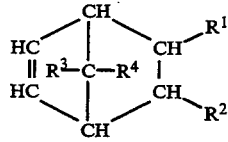
(I)

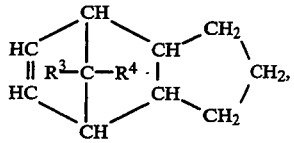
(II)

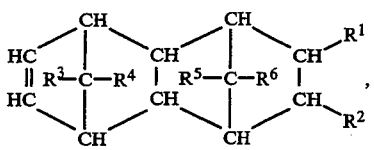
(III)

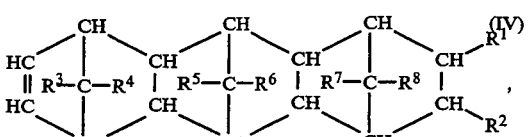
(IV)

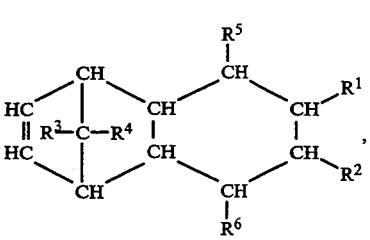
(V)

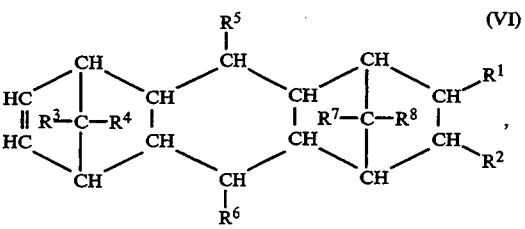
(VI)

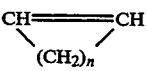
(VII)

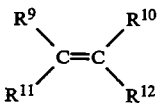
(VIII)

in which $R^1$, $R^2$, $R^3$, $R^4$, $R^5$, $R^6$, $R^7$, $R^8$, $R^9$, $R^{10}$, $R^{11}$, and $R^{12}$ are identical or different and are a hydrogen atom or a $C_1$-$C_8$-alkyl radical and n is a number from 2 to 10.

The catalyst may preferably comprise an aluminoxane of the formula (IX)

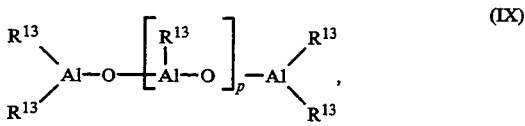
(IX)

for the linear type and/or of the formula (X)

(X)

for the cyclic type, where, in the formulae (IX) and (X), the radicals $R^{13}$ are identical or different and are a $C_1$-$C_6$-alkyl group, a $C_6$-$C_{18}$-aryl group, benzyl or hydrogen, and p is an integer from 2 to 50, and a metallocene of the formula XI

(XI)

in which $M^1$ is titanium, zirconium, hafnium, vanadium, niobium or tantalum, $R^{14}$ and $R^{15}$ are identical or different and are a hydrogen atom, a halogen atom, a $C_1$-$C_{10}$-alkyl group, a $C_6$-$C_{10}$-alkoxy group, a $C_6$-$C_{10}$-aryl group, a $C_6$-$C_{10}$-aryloxy group, a $C_2$-$C_{10}$-alkenyl group, a $C_7$-$C_{40}$-arylalkyl group, a $C_7$-$C_{40}$-alkyl aryl group or a $C_8$-$C_{40}$-arylalkenyl group, $R^{16}$ and $R^{17}$ are a mononuclear or polynuclear hydrocarbon radical which can form a sandwich structure with the central atom $M^1$, $R^{18}$ is

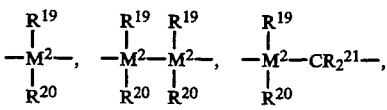

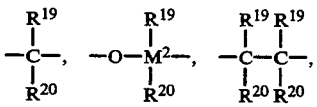

$=BR^{19}$, $=AIR^{19}$, —Ge—, —Sn—, —O—, —S—, $=SO$, $=SO_2$, $=NR^{19}$, $=CO$, $=PR^{19}$ or $P(O)R^{19}$, where $R^{19}$, $R^{20}$ and $R^{21}$ are identical or different and are a hydrogen atom, a halogen atom, a $C_1$-$C_{10}$-alkyl group, a $C_1$-$C_{10}$-fluoroalkyl group, a $C_6$-$C_{10}$-aryl group, a $C_1$-$C_{10}$-alkoxy group, a $C_2$-$C_{10}$-alkenyl group, a $C_7$-$C_{40}$-arylalkyl group, a $C_8$-$C_{40}$-arylalkenyl group or a $C_7$-$C_{40}$-alkylaryl group, or $R^{19}$ and $R^{20}$, or $R^{19}$ and $R^{21}$, form a ring, in each case together with the atoms linking them, and $M^2$ is silicon, germanium or tin.

The polyolefins used are derived from open-chain non-cyclic olefins, for example from ethylene, propylene, 1-butene, 1-hexene, 4-methyl-1-pentene, isobutylene, isoprene or butadiene. In addition to polyisoprene and polybutadiene, there may also be used elastomeric butadiene copolymers and terpolymers and/or their graft copolymers, and also elastomeric polyolefin copolymers and terpolymers and/or their graft copolymers. The polyolefins are preferably derived from 1-olefins, styrenes and/or their copolymers and terpolymers and also graft copolymers also falling under this classification. Preferred polyolefins comprise aliphatic 1-olefins, in particular those having 2 to 8 carbon atoms, for example ethylene, propylene, 1-butene, 1-hexene, 4-methyl-1-pentene and 1-octene. Particularly preferred are 1-olefins having 2 to 6 carbon atoms, such as ethylene, propylene, 1-butene, 1-hexene and 4-methyl-1-pentene. Polyolefins that can be used include in particular also copolymers and terpolymers of various 1-olefins, which may also comprise cyclic olefins, for example of ethylene, propylene, hexadiene, dicyclopentadiene and ethylidene norbornene. Particularly preferred polyolefins are polyethylene and polypropylene.

A process for the preparation of a suitable finely particulate block copolymer is the subject of U.S. patent application Ser. No. 19,094 filed on Feb. 18, 1993 which corresponds to the non-prior-published German Patent Application P 42 05 416.8, incorporated herein by reference. The block copolymers described there, which are included as additives in the blends prepared according to the invention, comprise at least two blocks with different amounts of olefins, one olefin being a cycloolefin $C_nH_{2n-2}$ were n=4 to 13 or an acyclic olefin. Corresponding homopolymers may also occur as impurities in the block copolymers. In general, different blocks of a block copolymer also have different glass transition temperatures. In the case of two-block copolymers the block with the low glass transition temperature is termed the "soft block", and the block with the higher glass transition temperature is termed the "hard block".

Surprisingly, the polymer blends with these block co-polymers prepared by the process according to the invention have outstanding mechanical properties. Their toughness is in all cases better than that of pure cycloolefin polymers, and their strength, hardness and modulus are in some cases higher than those of pure polyolefins. Compared to the blends without these block copolymers described in DD 214 137 and DD 214 623, the blends prepared according to the invention have an improved melt viscosity, higher elongation at break, and improved impact strength.

The polymer blends obtained by the process according to the invention comprise from 0.1 to 99 parts by weight of at least one block copolymer (C), from 0 to 95 parts by weight of cycloolefin polymer or polymers (A) and from 0 to 95 parts by weight of polyolefin or olefins (B), the sum of (A)+(B)+(C) being 100 parts by weight. Furthermore, additives known per se, for example fillers or dyes, can be incorporated.

For the blends according to the invention suitable cycloolefin polymers (A) comprise structural units that are derived from at least one monomer of the formulae I to VII

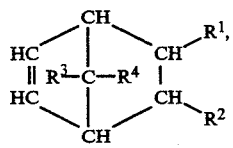 (I)

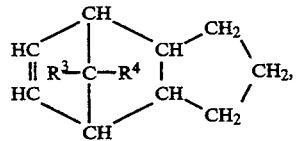 (II)

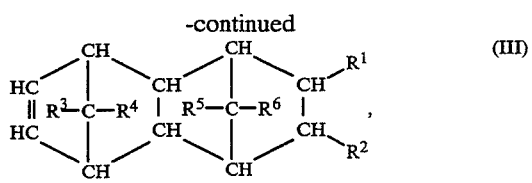 (III)

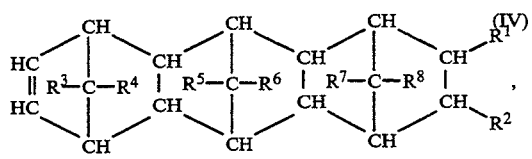 (IV)

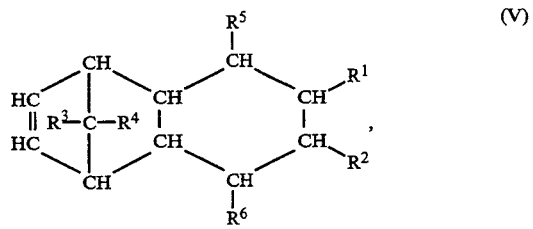 (V)

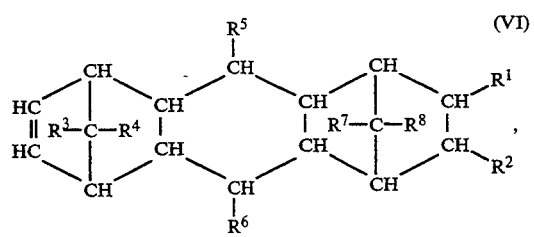 (VI)

 (VII)

where $R^1$, $R^2$, $R^3$, $R^4$, $R^5$, $R^6$, $R^7$ and $R^8$ are the same or different and are a hydrogen atom or a $C_1$–$C_8$-alkyl radical, the same radicals in the various formulae being able to be different, and n is an integer from 2 to 10.

The cycloolefin polymers (A) may comprise, in addition to the structural units that are derived from at least one monomer of the formulae I to VII, further structural units that are derived from at least one acyclic 1-olefin of the formula (VIII)

 (VIII)

where $R^9$, $R^{10}$, $R^{11}$ and $R^{12}$ are the same or different and are a hydrogen atom or a $C_1$–$C_8$-alkyl radical.

Preferred comonomers are ethylene or propylene. In particular copolymers of polycyclic olefins of the formulae I or III, and the acyclic olefins of the formula VIII, are used. Particularly preferred cycloolefins are norbornene and tetracyclododecene, which may be substituted by $C_1$–$C_6$-alkyl, ethylene-norbornene copolymers being particularly important. Of the monocyclic olefins of the formula VII, preference is given to cyclopentene, which may be substituted. Polycyclic olefins, monocyclic olefins and open-chain olefins are understood to include also mixtures of two or more olefins of the respective type. This means that cycloolefin homopolymers and copolymers such as bipolymers, terpolymers and multipolymers can be used.

The cycloolefin polymerizations proceeding with scission of the double bond may be catalyzed using more novel catalyst systems (EP-A-0 407 870, EP-A-0 203 799), and also with a conventional Ziegler catalyst system (DD-A-222 317).

Cycloolefin homopolymers and copolymers that comprise structural units derived from monomers of the formulae I to VI or VII are preferably prepared using a homogeneous catalyst. The latter comprises a metallocene, whose central atom is a metal from the group titanium, zirconium, hafnium, vanadium, niobium and tantalum, which forms a sandwich structure with two bridged mononuclear or polynuclear ligands, and an aluminoxane. The bridged metallocenes are prepared according to a known reaction scheme (cf. J. Organomet. Chem. 288 (1985) 63–67, EP-A-387 690). The aluminoxane acting as co-catalyst can be obtained by various methods (cf. S. Pasynkiewicz, Polyhedron 9 (1990) 429 and EP-A-302 424). The structure and also the polymerization of these cycloolefins is described in detail in EP-A-0 407 870, EP-A-0 485 893, EP-A-0 501 370 and EP-A-0 503 422. These compounds are cycloolefin copolymers that differ as regards their chemical uniformity and their polydispersity.

Preferably cycloolefin polymers are used having a viscosity number greater than 20 cm³/g (measured in decalin at 135° C. in a concentration of 0.1 g/100 ml) and a glass transition temperature (Tg) of from 100° to 240° C.

The blends may also comprise cycloolefin polymers that have been polymerized with ring opening in the presence of, for example, tungsten-, molybdenum-, rhodium- or rhenium-containing catalysts. The resultant cycloolefin polymers have double bonds that can be removed by hydrogenation (U.S. Pat. No. 3,557,072 and U.S. Pat. No. 4,178,424).

The cycloolefin block copolymers (C) contained in the blends prepared according to the invention are formed from a monomer mixture comprising one or more cycloolefins of the formulae I to VI, in particular formulae I or III, and at least one olefin selected from the group of cycloolefins of the formula VII and the acyclic olefins of the formula VIII.

Preference is given to those compounds of the formulae I and III in which the radicals $R^1$ to $R^6$ are hydrogen or a $C_1$–$C_6$-alkyl radical, and compounds of the formula VIII in which $R^9$, $R^{10}$ and $R^{11}$ are hydrogen (in particular ethylene and propylene).

According to the process of German Patent Application P 42 05 416.8, to prepare the cycloolefin block copolymer, from 0.1 to 95% by weight, based on the total amount of the monomers used, of at least one monomer of the formulae I, II, III, IV, V or VI

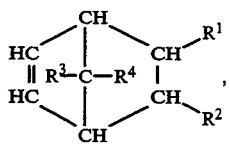

(I)

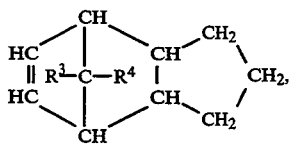

(II)

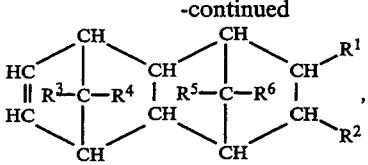

(III)

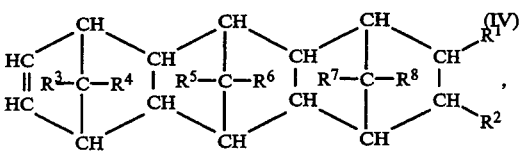

(IV)

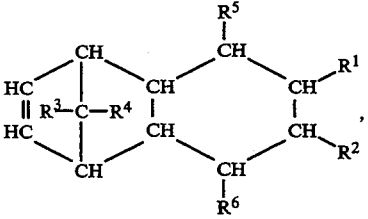

(V)

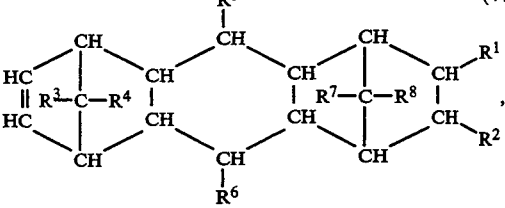

(VI)

where $R^1$, $R^2$, $R^3$, $R^4$, $R^5$, $R^6$, $R^7$ and $R^8$ are the same or different and are a hydrogen atom or a $C_1$–$C_8$-alkyl radical, the same radicals in the various formulae being able to be different, from 0 to 95% by weight, based on the total amount of the monomers used, of a cycloolefin of the formula VII

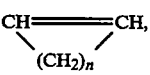

(VII)

where n is a number from 2 to 10, and from 0 to 99% by weight, based on the total amount of the monomers used, of at least one acyclic olefin of the formula VIII

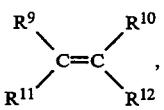

(VIII)

where $R^9$, $R^{10}$, $R^{11}$ and $R^{12}$ are the same or different and are a hydrogen atom or a $C_1$–$C_8$-alkyl radical, are polymerized at temperatures of from −78° to 150° C. and at a pressure of from 0.01 to 64 bar, in the presence of a catalyst comprising a cocatalyst and a metallocene of the formula XI

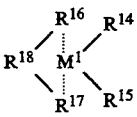

(XI)

where $M^1$ is titanium, zirconium, hafnium, vanadium, niobium or tantalum, $R^{14}$ and $R^{15}$ are the same or different and are a hydrogen atom, a halogen atom, a $C_1$–$C_{10}$-alkyl group, a $C_1$–$C_{10}$-alkoxy group, a $C_6$–$C_{10}$-aryl group, a $C_6$–$C_{10}$-aryloxy group, a $C_2$–$C_{10}$-alkenyl group, a $C_7$–$C_{40}$-arylalky group, a $C_7$–$C_{40}$-alkylaryl group or a $C_8$–$C_{40}$-arylalkenyl group, $R^{16}$ and $R^{17}$ are a mononuclear or polynuclear hydrocarbon radical which together with the central atom $M^1$ can form a sandwich structure $R^{18}$ is

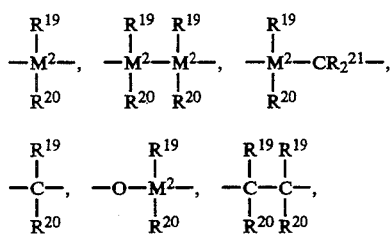

$=BR^{19}$, $=AlR^{19}$, $—Ge—$, $—Sn—$, $—O—$, $—S—$, $=SO$, $=SO_2$, $=NR^{19}$, $=CO$, $=PR^{19}$, or $P(O)R^{19}$, where $R^{19}$, $R^{20}$ and $R^{21}$, are the same or different and a hydrogen atom, a halogen atom, a $C_1$–$C_{10}$-alkyl group, a $C_1$–$C_{10}$-fluoroalkyl group, a $C_6$–$C_{10}$-fluoroaryl group, a $C_6$–$C_{10}$-aryl group, a $C_1$–$C_{10}$-alkoxy group, a $C_2$–$C_{10}$-alkenyl group, a $C_7$–$C_{40}$-arylalkyl group, a $C_8$–$C_{40}$-arylalkenyl group or a $C_7$–$C_{40}$-alkylaryl group, or $R^{19}$ and $R^{20}$ or $R^{19}$ and $R^{21}$ in each case form a ring with the atoms that connect them, and $M^2$ is silicon, germanium or tin. The reaction conditions are changed - always at a molecular weight distribution $M_w/M_n$ of less than 2, always based on the polymer block that is being formed—in such a way that the monomer-comonomer ratio changes by at least 10%, or a further polymerizable monomer of the formulae I–VIII is metered into the monomer or monomers.

The polymerization is carried out in such a way that a two-stage or multistage polymerization takes place according to the number of changes in the parameters that are made or according to the monomer composition, a homopolymer sequence of one of the monomers of the formulae I to VIII also being able to be polymerized in the first polymerization stage. Alkyl is straight-chain or branched alkyl. The monocyclic olefin VII may also be substituted (e.g. by alkyl or aryl radicals).

The polymerization takes place in dilute solution (<80% by vol. of cycloolefin), in concentrated solution (>80% by vol. of cycloolefin), or directly in the liquid, undiluted cycloolefin monomer.

The temperature and reaction time must be suitably matched depending on the activity of the catalyst, the desired molecular weight and desired molecular weight distribution of the respective polymer block. Also, the concentration of the monomers and also the nature of the solvent must be taken into account, especially as these parameters basically determine the relative incorporation rates of the monomers and are thus decisive for the glass transition temperature and heat resistance of the polymers.

The lower the polymerization temperature is chosen within the range from $-78°$ to $150°$ C., preferably from $-78°$ to $80°$ C. and particularly preferably from $20°$ to $80°$ C., the longer the polymerization duration can be, with almost the same breadth of molecular weight distribution $M_w/M_n$ for the respective polymer blocks.

If the sudden change in the reaction conditions is effected at a point in time in which the molecular weight distribution $M_w/M_n$ of the forming polymer block is equal to 1, then it can be assumed with certainty that all polymer blocks formed in this polymerization stage have a catalyst-active chain end (i.e. are living polymer chains), and thus a further block can be polymerized onto these chain ends by changing the polymerization conditions. The coupling is 100% for this extreme case. The more the molecular weight distribution $M_w/M_n$ of the polymer blocks formed in a polymerization stage deviates from 1, i.e. $M_w/M_n > 1$, the greater the increase in the number of catalyst-inactive chain ends (i.e. dead chain ends or terminated chains), which are no longer capable of a coupling of a further block.

For the process for preparing block copolymers this means that the more the value $M_w/M_n$ of the polymer block X prepared in the polymerization stage X is in the region of 1 at the point in time at which the change in the reaction parameters takes place, the greater the proportion of block polymer chains becomes in the end product in which a chemical coupling between block X and block X+1 has been effected.

Based on the structural uniformity and purity of the cycloolefin block copolymers, this means that the time windows for the individual polymerization stages shall as far as possible be chosen so that they correspond to a $M_w/M_n$ of the corresponding polymer blocks of almost 1, in order to obtain cycloolefin block copolymers of high purity and high structural uniformity.

If it is also desired to achieve a specific molecular weight for a polymer block, then the reaction duration must also be adjusted to the desired molecular weight.

During a polymerization stage or the formation of a polymer block, the monomer ratios in the reaction space are generally maintained constant so that chemically uniform polymer blocks are formed. It is however then also possible to change the monomer ratios continuously during a polymerization stage, which then leads to polymer blocks that exhibit a structural gradient along the polymer chain, i.e. the incorporation ratio (for example the ratio of the number of norbornene building blocks to that of the ethylene building blocks in a part of the polymer block) changes continuously along the corresponding polymer block. In the case of polymer blocks that are built up from more than two types of monomers, this gradient can be achieved by continuously changing the concentration of a single monomer component.

Blocks with structural gradients can also be produced in those polymerization stages in which the concentration of several monomer components is simultaneously continuously changed.

The changes to be made in the monomer ratios can be achieved for example by changing the pressure of the acyclic olefin, by changing the temperature and thus the solubility of gaseous olefins, by dilution with solvents at constant pressure of the acyclic olefin or also by metering in a liquid monomer. Furthermore, several of the aforementioned parameters can be simultaneously altered.

Such sudden and also continuous changes in the monomer ratio—and thus the preparation of block copolymers—can be effected not only under batchwise control of the reaction but also under continuous control of the reaction.

Continuous and also multistage polymerization processes are particularly advantageous since they permit an economically favorable use of the cycloolefin. Also, in continuous processes the cyclic olefin, which may occur as residual monomer together with the polymer, can be recovered and returned to the reaction mixture.

With such a polymerization procedure the block length can be controlled via the throughput and reaction volume of the different reaction vessels (i.e. these two quantities determine the residence time at the different reaction locations).

Preferred cycloolefin block copolymers that may be mentioned for the blends are norbornene/ethylene block copolymers, norbornene/ethylene/propylene block copolymers, dimethanooctahydronaphthalene (tetracyclododecene)/ethylene block copolymers, dimethanooctahydronaphthalene/ethylene/propylene block copolymers and block copolymers in which each polymer sequence or polymer block is built up from a copolymer, i.e. a bipolymer, terpolymer or multipolymer, and also norbornene or dimethanooctahydronaphthalene has been incorporated in at least one polymerization stage. The particularly preferred norbornene/ethylene block copolymers, norbornene/ethylene/propylene block copolymers and corresponding dimethanooctahydronaphthalene block copolymers are built up from norbornene/ethylene, norbornene/ethylene/propylene copolymer sequences or corresponding dimethanooctahydronaphthalene copolymer sequences of different composition, i.e they comprise blocks (polymer segments) that in each case are norbornene/ethylene copolymers, norbornene/ethylene/propylene terpolymers or corresponding dimethanooctahydronaphthalene copolymers or terpolymers.

The cycloolefin block copolymers prepared according to the described process can for the purposes of the present invention be termed compatibilizers since they can arrange themselves at the interface of the polymer phases and hence reduce the interfacial tension, increase the adhesion between the phases, and control the size of the particles (disperse phase) in the blend. Compatibilization polymers is generally more successful the greater the structural similarities between the blocks of the compatibilizer mediator and those of the polymers to be compatibilized. Complete miscibility of at least one type of block in at least one polymer is also advantageous in this connection. Applied to the compatibilization of cycloolefin polymers and polyolefins, there should preferably be used cycloolefin block copolymers that comprise, as predominantly incorporated monomer component or components in the blocks, those that are also contained as monomer component or components in the polymers to be compatibilized. If the polyolefin (B) is polyethylene, then preferably the block copolymer (C) should comprise at least one block predominantly of ethylene units and at least one block predominantly of cycloolefin units, in particular those that are present in the cycloolefin copolymer (A). The same also applies to polypropylene. The blends containing phase mediators generally have dramatically improved mechanical properties. Also, they can stabilize the phase structures by preventing coalescence.

The polyolefins (B) used in the blends are derived from open-chain noncyclic olefins, for example from ethylene, propylene, 1-butene, 1-hexene, 4-methyl-1-pentene, isobutylene, isoprene or butadiene. In addition to polyisoprene and polybutadiene, there may also be used elastomeric butadiene copolymers and terpolymers and/or their graft copolymers, and also elastomeric polyolefin copolymers and terpolymers and/or their graft copolymers. The polyolefins are preferably derived from 1-olefins, styrenes and/or their copolymers and terpolymers and also graft copolymers being included in this classification. Preferred polyolefins comprise aliphatic 1-olefins, in particular those having 2 to 8 carbon atoms, for example ethylene, propylene, 1-butene, 1-hexene, 4-methyl-1-pentene and 1-octene.

Polyolefins that can be used include in particular also copolymers and terpolymers of various 1-olefins, which may also comprise cyclic olefins, for example of ethylene, propylene, hexadiene, dicyclopentadiene and ethylidene norbornene.

The polyethylenes (B) preferably used in the blends are high density (HDPE) polyethylene and medium density (MDPE) polyethylene. Such polyethylenes are prepared by the low-pressure process using suitable catalysts. Characterizing properties are: low density compared to other plastics ($<0.96$ g/cm$^3$), high toughness and elongation at break, very good electrical and dielectric properties, very good resistance to chemicals, and, depending on the type, good resistance to stress crack formation and good processability and machinability.

Polyethylene molecules contain branchings. The degree of branching of the molecular chains and the length of the side chains substantially influence the properties of the polyethylene. The HDPE and MDPE types are slightly branched and have only short side chains.

Polyethylene crystallizes from the melt on cooling: the long molecular chains arrange themselves in a folded manner in domains and form very small crystallites, which are joined together with amorphous zones to form superlattices, i.e. spherulites. The crystallization is increasingly possible the shorter the chains and the less the degree of branching. The crystalline fraction has a higher density than the amorphous fraction. Different densities are therefore obtained, depending on the crystalline fraction. This degree of crystallization is between 35 and 80%, depending on the type of polyethylene.

High density polyethylene (HDPE) reaches a degree of crystallization of 60 to 80% at densities of from 0.940 g/cm$^3$ to 0.965 g/cm$^3$; medium density polyethylene (MDPE) reaches a degree of crystallization of 50 to 60% at a density of from 0.930 g/cm$^3$ to 0.940 g/cm$^3$.

The properties of polyethylene are largely determined by density, molecular weight and molecular weight distribution. For example, the impact strength and notched impact strength, tear strength, elongation at break and resistance to stress crack formation increase with the molecular weight. HDPE with a narrow molecular weight distribution and having a small low molecular weight fraction is more impact resistant, even at low temperatures, than HDPE having a broad molecular weight distribution, within the same ranges for the melt flow index and viscosity number. Types having a broad molecular weight distribution are in turn more easily processable.

The higher the molecular weight of polyethylene, the more difficult it becomes to prepare blends by means of extruders. Whereas a polyethylene with a mean molecular weight of about $4.9 \times 10^{+5}$ g/mol can just be used as a single polyethylene component, polyethylene types having for example molecular weights of between 0.5 and $8 \times 10^6$ g/mol can be processed by means of extrusion or injection molding only in blended form, i.e. as a blend according to the invention with correspondingly increasing contents of components A and C. In order to optimize the processability of such blends while largely retaining the mechanical properties, in addition to high molecular weight polyethylene HDPE ($0.1-0.5 \times 10^6$ g/mol) may also be incorporated as part of the component B into the blends according to the invention. These ultrahigh molecular weight low-pressure polyethylenes (UHMWPE) may specifically also be constituents of the polymer blends.

Polypropylene is an isotactic, syndiotactic or atactic polypropylene prepared using stereospecifically acting catalysts. Only isotactic polypropylene, in which all methyl groups are arranged on one side of the molecular chain, imagined to be in the form of a zigzag, has the properties of a technically usable material.

On cooling from the melt, this regular structure promotes the formation of crystalline regions. However, the chain molecules are seldom incorporated over their whole length into a crystallite since they also comprise non-isotactic fractions and thus do not comprise crystallizable fractions. Furthermore, amorphous regions are formed due to the convolutions of the chains in the melt, particularly at a high degree of polymerization. The crystalline fraction depends on the production conditions of the molded parts and is from 50% to 70%. The partly crystalline structure imparts a certain strength and rigidity on account of the strong secondary forces in the crystallite, whereas the unordered regions with the higher mobility impart flexibility and toughness to their chain segments above the glass transition temperature.

The proportion of cycloolefin polymers (A) in the blends according to the invention is preferably from 0 to 90% by weight and particularly preferably from 0 to 85% by weight, and the proportion of polyolefins (B) in the blends prepared according to the invention is preferably at most 90% by weight and particularly preferably at most 85% by weight. The proportion of the cycloolefin block copolymers is preferably from 1 to 60% by weight and particularly preferably from 1 to 55% by weight, the proportions of the components A, B and C totalling 100% by weight. The blends prepared according to the invention may comprise one or more cycloolefin polymers, one or more polyolefins, in particular polyethylenes or polypropylenes, and one or more cycloolefin block copolymers.

The aforementioned polymer blends are prepared and processed by known standard methods for thermoplastics, for example by kneading, compression molding, extrusion or injection molding.

The blends prepared according to the invention may comprise additives, for example thermal stabilizers, UV stabilizers, antistats, flameproofing agents, plasticizers lubricants, pigments, dyes, optical brighteners, processing auxiliaries, inorganic and organic fillers, i.e. in particular also reinforcing materials such as glass fibers, carbon fibers or high-modulus fibers. The blends may be used particularly advantageously for the production of moldings by the compression molding, injection molding or extrusion processes. Examples of moldings include sheets, fibers, films and hoses.

The following polymers were prepared by standard methods: cycloolefin copolymers A1 [COC A1], A2 [COC A2], A3[COC A3]and A4[COC A4]

Preparation of COC A1

A clean and dry 75 dm$^3$ capacity polymerization reactor equipped with a stirrer was flushed with nitrogen and then with ethylene. 20550 g of norbornene melt (Nb) were then placed in the polymerization reactor. The reactor contents were heated to 70° C. while stirring and ethylene was injected to a pressure of 6 bar.

250 cm$^3$ of a solution of methylaluminoxane in toluene (10.1% by weight of methylaluminoxane having a molecular weight of 1300 g/mol according to cryoscopic measurement) were then metered into the reactor and the mixture was stirred for 15 minutes at 70° C., the ethylene pressure being maintained at 6 bar by injecting in further ethylene. In parallel to this 500 mg of diphenyimethylene (9-fluorenyl ) cyclopentadienyl zirconium dichloride were dissolved in 250 cm$^3$ of a solution of methylaluminoxane in toluene (concentration and quality see above) and preactivated by standing for 15 minutes. The solution of the complex (catalyst solution) was then metered into the reactor. In order to stop the molecular weight increasing, hydrogen can be added discontinuously or continuously through a lock to the reaction vessel immediately after the catalyst has been metered in (see COC A2 and COC A3). Polymerization was then carried out at 70° C. for 305 minutes while stirring, the ethylene pressure being maintained at 6 bar by injecting in further ethylene. The reactor contents were then quickly discharged into a stirred vessel containing 40 1 of liquid saturated aliphatic hydrocarbons ( ®Exxsol 100/110), 1000 g of ®Celite J 100 and also 200 cm$^3$ of deionized water at 70° C. The mixture was filtered so that the filter aid (Celite J 100 ) was retained and a clear polymer solution was obtained as filtrate. The clear solution was precipitated in acetone, stirred for 10 minutes, and the suspended polymer solid was then filtered off.

In order to remove residual solvent from the polymer, the latter was stirred twice more with acetone and filtered off. Drying was carried out at 80° C. under reduced pressure within 15 hours.

Yield: 4400 g

Preparation of COC A2

The preparation of COC A2 was performed in a similar manner to COC A1, 1350 ml of hydrogen being added immediately after the catalyst had been metered in. The other altered reaction conditions are summarized in Table 1.

Preparation of COC A3

The preparation of COC A3 was performed in a similar manner to COC A1, 1875 ml of hydrogen being continuously added after the catalyst had been metered in. The other altered reaction conditions are summarized in Table 1.

Preparation of COC A4

The preparation of COC A4 was performed in a similar manner to COC A1. The altered reaction conditions are summarized in Table 1.

TABLE 1

| Norbornene | Metallocene | Catalyst | Amount of |
| --- | --- | --- | --- |

TABLE 1-continued

| Cycloolefin copolymer | amount [g] | T [°C.] | Pressure [bar] | Type | Amount [mg] | solution [cm³] | Time [min.] | product [g] |
|---|---|---|---|---|---|---|---|---|
| A2 | 20550 | 70 | 3.5 | A | 250 | 750 | 135 | 5716 |
| A3 | 10700* | 70 | 3 | A | 350 | 850 | 72 | 6000 |
| A4 | 10700* | 70 | 2.9 | A | 350 | 1500 | 55 | 4523 |

*in 27 l of Exxsol

Metallocene A: Diphenylmethylene (9-fluorenyl) cyclopentadienyl zirconium dichloride

Cycloolefin copolymer A5 [COC A5]

A clean and dry 75 dm³ capacity polymerization reactor equipped with a stirrer was flushed with nitrogen and then with ethylene. 27 l of Exxsol and 10700 g of norbornene melt were then placed in the polymerization reactor. The reactor was heated to 70° C. while stirring and ethylene was injected to a pressure of 2.5 bar.

500 cm³ of a solution of methylaluminoxane in toluene (10.1% by weight of methylaluminoxane having a molecular weight of 1300 g/mol according to cryoscopic measurement) were then metered into the reactor and the mixture was stirred for 15 minutes at 70° C., the ethylene pressure being maintained at 2.5 bar by injecting in further ethylene. Parallel to this 37 mg of i-propylene(9-fluorenyl)cyclopentadienyl zirconium dichloride were dissolved in 300 cm³ of a solution of methylaluminoxane in toluene (concentration and quality see above) and preactivated by standing for 15 minutes. The solution of the metallocene (catalyst solution) was then metered into the reactor. Polymerization was carried out for 90 minutes at 70° C. while stirring, the ethylene pressure being maintained at 2.5 bar by injecting in further ethylene. The reactor contents were then quickly discharged into a stirred vessel containing 40 l of Exxsol 100/110, 1000 g of Celite J 100 and also 200 cm³ of deionized water at 70° C. The mixture was filtered so that the filter aid (Celite J 100) was retained and a clear polymer solution was obtained as filtrate. The clear solution was precipitated in acetone, stirred for 10 minutes, and the suspended polymer solid was filtered off.

In order to remove residual solvent from the polymer, the latter was stirred twice more with acetone and filtered off. Drying was carried out at 80° C. under reduced pressure within 15 hours.

Yield: 5100 g

The physical characteristics of the five cycloolefin copolymers COC A1, COC A2, COC A3, COC A4 and COC A5 are shown in Table 2.

Flow rate: 0.5 ml/min., concentration 0.1 g/dl
RI detector, calibration: polyethylene (901 PE)

Further characteristics of the cycloolefin copolymers A1, A2, A3, A4 and A5 can be found in the examples.

Preparation of cycloolefin block copolymers COC C1, COC C2, COC C3 and COC C4

Preparation of COC C1

A clean and dry 1.5 l capacity autoclave equipped with a stirrer was flushed with nitrogen and then with ethylene.

375 ml of toluene and 107 g (1.14 mol) of norbornene and also 20 ml of a 10% strength solution of methylaluminoxane in toluene were then placed in the autoclave. The autoclave was heated to 20° C. while stirring and ethylene was injected in to a pressure of 1.0 bar.

Parallel to this 90.7 mg (0.2 mmol) of rac-dimethylsilylbis(1-indenyl) zirconium dichloride were dissolved in 20 ml of methylaluminoxane solution (see above) and preactivated by standing for 15 minutes. The metallocenemethylaluminoxane solution was then metered into the autoclave. Polymerization was then carried out for 45 minutes at 20° C. while stirring, the ethylene pressure being maintained at 1.0 bar by injecting in further ethylene.

After 45 minutes a solution of 520 ml of toluene and 20 ml of a 20% strength solution of trimethylaluminum in ®Exxsol was then metered into the autoclave together with ethylene at a pressure of 15.0 bar and polymerized for 2 minutes at this pressure. The stopper solution of 30 ml of isopropanol and 20 ml of Exxsol was then metered into the autoclave under excess pressure. The pressure of the polymer solution was released while stirring constantly, and the solution was then discharged.

The solution was precipitated in acetone and washed twice with acetone. The polymer obtained was then stirred into a concentrated hydrochloric acid-water solution, in which it stood for about 2 hours. The polymer was then washed until it gave a neutral reaction and was stirred twice more with acetone. Drying was carried out at 50° C. under a reduced pressure within 15

TABLE 2

| Cycloolefin copolymer | Incorporation* of | | VN [cm³/g] | $<Mw>$ $\times 10^{-4}$ [g/mol] | $<Mn>$ $\times 10^{-4}$ [g/mol] | $\frac{<Mw>}{<Mn>}$ |
|---|---|---|---|---|---|---|
| | Ethylene [mol %] | Norbornene [mol %] | | | | |
| A1 | 48 | 52 | 208 | 38.3 | 17.4 | 2.2 |
| A2 | 45 | 55 | 106 | 14.8 | 4.3 | 3.4 |
| A3 | 52 | 48 | 76 | 8.2 | 2.6 | 3.2 |
| A4 | 46 | 54 | 108 | 13.6 | 6.8 | 2.0 |
| A5 | 52 | 48 | 142 | 28.0 | 12.8 | 2.2 |

*measured by $^{13}$C nuclear magnetic resonance spectroscopy
VN: viscosity number measured according to DIN 53728

GPC: $<Mw>,<Mn>$; 150-C ALC Millipore Waters Chromatograph
Column set: 4 Schodex columns AT-80 M/S
Solvent: o-dichlorobenzene at 135° C.

hours.
Yield: 36.6 g

Preparation of COC C2

The preparation of COC C2 was performed in a similar manner to COC C1, 85 mg (0.19 mmol) of rac-dimethylsilylbis(1-indenyl) zirconium dichloride being used and the solution of 520 ml of toluene and 20 ml of a 20% strength solution of trimethylaluminum in ®Exxsol being metered in and ethylene being injected to a pressure of 15.0 bar after 30 minutes.

Yield: 96.4 g

Preparation of COC C3

A clean and dry 75 dm³ capacity polymerization reactor equipped with a stirrer was flushed with nitrogen and then with ethylene. 50 l of Exxsol and 2.4 kg of norbornene melt were then placed in the polymerization reactor. The reactor was heated to 40° C. while stirring and ethylene was injected in to a pressure of 1 bar.

500 cm³ of a solution of methylaluminoxane in toluene (10.1% by weight of methylaluminoxane having a molecular weight of 1300 g/mol according to cryoscopic measurement) were then metered into the reactor and the mixture was stirred for 15 minutes at 40° C., the ethylene pressure being maintained at 1 bar by injecting in further ethylene. Parallel to this 2000 mg of rac-dimethylsilylbis(1-indenyl) zirconium dichloride were dissolved in 500 cm³ of a solution of methylaluminoxane in toluene (concentration and quality see above) and preactivated by standing for 15 minutes. The prepared catalyst solution was then metered into the reactor. Polymerization was then carried out for 45 minutes at 40° C. while stirring, the ethylene pressure being maintained at 1 bar by injecting further ethylene. 1 l of propylene (liquid) was then metered into the polymerization reactor, the reaction pressure was raised to 3.3 bar with ethylene, and was maintained at 3.3 bar by injecting in further ethylene. The reactor contents were then quickly discharged into a stirred vessel containing 40 l of Exxsol 100/110, 1000 g of ®Celite J 100 and also 200 cm³ of deionized water at 70° C. The mixture was filtered so that the filter aid (Celite J 100) was retained and a clear polymer solution was obtained as filtrate. The clear solution was precipitated in acetone, stirred for 10 minutes, and the suspended polymer solid was then filtered off.

In order to remove residual solvent from the polymer the latter was stirred twice more with acetone and filtered off. Drying was carried out at 80° C. under reduced pressure within 15 hours.

Yield: 3200 g

Preparation of COC C4

A clean and dry 75 dm³ capacity polymerization reactor equipped with a stirrer was flushed with nitrogen and then with ethylene. 16.5 l of toluene and 3.5 l of norbornene melt were then placed in the polymerization reactor. The reactor was heated to 40° C. while stirring and ethylene was injected to a pressure of 1 bar.

500 cm³ of a solution of methylaluminoxane in toluene (10.1% by weight of methylaluminoxane having a molecular weight of 1300 g/mol according to cryoscopic measurement) were then metered into the reactor and the mixture was stirred for 15 minutes at 40° C., the ethylene pressure being maintained at 1 bar by injecting in further ethylene. Parallel to this 800 mg of rac-dimethylsilylbis(1-indenyl) zirconium dichloride were dissolved in 500 cm³ of a solution of methylaluminoxane in toluene (concentration and quality see above) and preactivated by standing for 15 minutes. 14 l of toluene together with 2000 cm³ of a solution of methylaluminoxane in toluene (concentration and quality see above) were placed in a pressure lock and saturated with propylene at 5 bar. The pressure was then raised to 15 bar with ethylene and further ethylene was injected until the solution was saturated. Following this the solution of the metallocene (catalyst solution) was metered into the reactor. Polymerization was then carried out for 30 minutes at 40° C. while stirring, the ethylene pressure being maintained at 1 bar by injecting in further ethylene. The contents of the pressure lock were then abruptly metered into the polymerization reactor and the reaction pressure was maintained at 13.5 bar with ethylene. After 5 minutes the reactor contents were quickly discharged into a stirred vessel containing 40 l of Exxsol 100/110, 1000 g of ®Celite J 100 and also 200 cm³ of deionized water at 70° C. The mixture was filtered so that the filter aid (Celite J 100) was retained and a clear polymer solution was obtained as filtrate. The clear solution was precipitated in acetone, stirred for 10 minutes, and the suspended polymer solid was then filtered off.

In order to remove residual solvent from the polymer the latter was stirred twice more with acetone and filtered off. Drying was carried out at 50° C. under reduced pressure within 15 hours.

Yield: 5727 g

The physical characteristics of the cycloolefin block copolymers are given in Table 3 and in the examples:

TABLE 3

| Cycloolefin-block-copolymer | VN [cm³/g] | $<Mw> \times 10^{-4}$ [g/mol] | $<Mn> \times 10^{-4}$ [g/mol] | $\frac{<Mw>}{<Mn>}$ | Tg 1 [°C.] | Tg 2 [°C.] |
|---|---|---|---|---|---|---|
| C1 | 148.8 | 11.5 | 5.8 | 2.0 | 27.8 | 120.0 |
| C2 | 110.9 | 8.4 | 4.5 | 1.9 | 25.1 | 152.8 |
| C3 | 122.6 | 11.2 | 5.9 | 1.9 | 29.5 | 107.8 |
| C4 | 129.0 | 8.9 | 1.9 | 4.7 | −11.5 | 150.8 |

VN: Viscosity number determined according to DIN 53728

GPC: $<Mw>$, $<Mn>$; 150-C ALC Millipore Waters Chromatograph
Column set: 4 Schodex columns AT-80 M/S
Solvent: o-dichlorobenzene at 135° C.
Flow rate: 0.5 ml/min., concentration 0.1 g/dl
RI detector, calibration: polyethylene (809 PE)
Tg: Glass transition temperature stages measured with a differential scanning calorimeter (DSC-7) from Perkin-Elmer (Überlingen)—heating-up and cooling rate 20 K/minute—and with an automatic torsion pendulum from Brabender (Duisburg)

Polyethylene (B1/B2/B3/B4)

The high-density polyethylenes B1, B2, B3 and B4 used can be obtained commercially. B1 is marketed for example as ®Hostalen GF 4760 by Hoechst AG, Frankfurt am Main. B2 is ®Hostalen GD 4760, B3 is ®Hostalen GM 9240 HT and B4 is ®Hostalen GURX106 (UHMWPE).

Polypropylene (B5)

The isotactic polypropylene B5 used can be obtained commercially and is marketed as ®Hostaien PPH 1050 by Hoechst AG, Frankfurt am Main.

Preparation of the blends

The aforedescribed polymers were first of all dried (115° C., 24 hours, reduced pressure) and were then kneaded and extruded in various weight ratios in a laboratory compounder (HAAKE (Karlsruhe), ®Rheocord System 40/ Rheomix 600)) and laboratory extruder (HAAKE (Karlsruhe) ®Rheocord System 90/Rheomex TW 100)) under a shielding gas (Ar). The ground and granulated blends obtained were dried (115° C., 24 hours, reduced pressure) and were then either press molded into sheets (120×1 mm) (vacuum press: ®Polystat 200 S, Schwabenthan (Berlin)) or injection molded into moldings (large dumbbell-shaped test pieces according to ISO/DIS 3167, small standard test piece according to DIN 53451) (injection molding machine: KM 90-210 B with ®Microcontrole MC 3, Krauss Maffei (Munich)). The resultant press-molded sheets, dumbbell-shaped test pieces and small standard test pieces were investigated as regards their physical properties.

The following apparatus was used for this purpose:

A differential scanning calorimeter (DSC-7) from Perkin-Elmer (Überlingen) for measuring for example glass transition temperature stages, melting points and heats of fusion.

An automatic torsion pendulum from Brabender (Duisburg) for measuring the shear modulus, damping and linear expansion.

A tensile test machine (type: ®Instron 4302) from Instron (Offenbach).

A melt flow index test apparatus (MPS-D) from Goettfert (Buchen) for measuring flowabilities. Melt flow index according to DIN 53735-MVI-B (dead weight-/variable temperature; cylider: internal dimension 9.55 (+/−0.01) mm, length at least 115 mm, outlet nozzle 2.095 (+/−0.005) mm, a melting time of 5 minutes being selected.

A hardness tester (type: Zwick 3106) from Zwick (Ulm) for measuring the ball indentation hardnesses according to DIN ISO 2039.

A pendulum impact tester (type: Zwick 5102) from Zwick (Ulm) for measuring the impact strengths according to DIN 53453.

The heat distortion temperature (HDT) was measured according to DIN 53461.

The Izod notched impact strength was measured according to ISO 180/1A.

EXAMPLE 1

The cycloolefin copolymer A1, the polyethylene B1 and, in some cases, the cycloolefin block copolymer C1 (phase mediator) were thoroughly dried and then kneaded together in various weight ratios under an argon atmosphere using the laboratory compounder. The following table shows the measured thermal properties of the blends.

| COC A1 [wt.-%] | HDPE B1 [wt.-%] | COC C1 [wt.-%] | Cooling | | 2nd Heating | | | | |
|---|---|---|---|---|---|---|---|---|---|
| | | | Tm HDPE B1 [°C.] | dHm HDPE B1 [J/g] | Tm HDPE B1 [°C.] | dHm HDPE B1 [J/g] | Tg COC A1 [°C.] | Tg1 COC C1 [°C.] | Tg2 COC C1 [°C.] |
| 100 | — | — | — | — | — | — | 168 | — | — |
| 45 | 45 | 10 | 114 | 96,7* | 134 | 87,9 | 168 | + | + |
| 45 | 55 | — | 113 | 124* | 139 | 112,4 | 168 | — | — |
| 50 | 50 | — | 114 | 105* | 135 | 98,7 | 167 | — | — |
| 81,8 | — | 18,2 | — | — | — | — | 166 | + | 122 |
| — | 81,8 | 18,2 | 114 | 179* | 138 | 175,7 | — | 28 | 0 |
| — | — | 100 | — | — | — | — | — | 28 | 120 |
| — | 100 | — | 116 | 213,1 | 135 | 205,3 | — | — | — |
| 35 | 35 | 30 | 114 | 73,8* | 134 | 71,5 | 165 | 25 | o |

Footnotes:
Heating-up and cooling rate: 20°/minute
*Tm and Tg not separated
+ not measurable (equipment sensitivity too low)
o Tg2 less than Tm

EXAMPLE 2

The cycloolefin copolymer A1, the polyethylene B1 and, in some cases, the cycloolefin block copolymer C1 (phase mediator) were thoroughly dried and then kneaded together in various weight ratios under an argon atmosphere using the laboratory compounder, and were then ground. The ground products were used, after having been thoroughly dried, to measure the flowabilities, the relevant values being shown in the following table.

| COC A1 [% by weight] | HDPE B1 [% by weight] | COC C1 [% by weight] | MVI 21,6 kg/ 250° C. [cm³/10 min] |
|---|---|---|---|
| 100 | — | — | 1,5 |
| 45 | 45 | 10/e | 30,0 |
| 45 | 55 | — | 34,8 |
| 50 | 50 | — | 38,4 |
| 81,8 | — | 18,2/e | 23,2 |
| — | 81,8 | 18,2/e | 48,2 |
| — | 100 | — | 81,5 |
| 35 | 35 | 30/e | 31,6 |

The tests identified with an "e" are according to the invention, the remainder being comparative tests.

EXAMPLE 3

The cycloolefin copolymer A1, the polyethylene B1 and, in some cases, the cycloolefin block copolymer C1 (phase mediator) were thoroughly dried and then kneaded together in various weight ratios under an argon atmosphere using the laboratory compounder, and were then ground. The ground products were thoroughly dried and press-molded into sheets. The following table shows the mechanical data of the blends that were measured in the tensile test.

| COC A1 [wt.-%] | HDPE B1 [wt.-%] | COC C1 [wt.-%] | E-Modul [GPa] | Yield Stress [MPa] | elongation at break [%] |
|---|---|---|---|---|---|
| 100 | — | — | 3,5 | 62 | 6 |
| 45 | 45 | 10/e | 2,6 | 52 | 88 |
| 45 | 55 | — | 2,5 | 52 | 21 |
| 50 | 50 | — | 2,6 | 55 | 11 |
| 81,8 | — | 18,2/e | 3,4 | 60 | 10 |
| — | 81,8 | 18,2/e | 1,4 | 33 | 550 |
| — | 100 | — | 1,2 | 27 | 660 |
| 35 | 35 | 30/e | 2,4 | 46 | 138 |

E-Modul = Modulus of elasticity

The tests identified with an "e" are according to the invention, the remainder being comparative tests.

EXAMPLE 4

The cycloolefin copolymer A2, the polyethylene B1 and, in some cases, the cycloolefin block copolymer C2 (phase mediator) were thoroughly dried and then kneaded together in various weight ratios under an argon atmosphere using the laboratory compounder. The following table shows the measured thermal properties of the blends.

| COC A2 [wt.-%] | HDPE B1 [wt.-%] | COC C2 [wt.-%] | Cooling Tm HDPE B1 [°C.] | Cooling dHm HDPE B1 [J/g] | 2nd Heating Tm HDPE B1 [°C.] | 2nd Heating dHm HDPE B1 [J/g] | Tg COC A2 [°C.] | Tg1 COC C2 [°C.] | Tg2 COC C2 [°C.] |
|---|---|---|---|---|---|---|---|---|---|
| 100 | — | — | — | — | — | — | 183 | — | — |
| 42,9 | 47,1 | 10 | 115 | 99,1* | 134 | 91,5 | 181 | + | + |
| 42,9 | 57,1 | — | 113 | 120,3* | 136 | 117,4 | 183 | — | — |
| 81,1 | — | 18,9 | — | — | — | — | 182 | 13 | 154 |
| — | 82,5 | 17,5 | 116 | 179,4* | 136 | 175,1 | — | + | + |
| 35,8 | 44,2 | 20 | 115 | 93,5* | 135 | 83,4 | 181 | 23 | + |
| 35,8 | 64,2 | — | 112 | 138,8* | 140 | 131,3 | 185 | — | — |
| 64,2 | — | 35,8 | — | — | — | — | 180 | 20 | 153 |
| 28,7 | 41,3 | 30 | 116 | 87,8* | 134 | 77,0 | 182 | 23 | + |
| 28,7 | 71,3 | — | 114 | 157,5* | 136 | 150,3 | 182 | — | — |
| — | 100 | — | 116 | 213,1 | 135 | 205,3 | — | — | — |
| — | — | 100 | — | — | — | — | — | 25 | 153 |

Heating-up and cooling rate: 20K/minute
*Tm and Tg not separated
+ not measurable (equipment sensitivity too low)

EXAMPLE 5

The cycloolefin copolymer A2, the polyethylene B1 and, in some cases, the cycloolefin block copolymer C2 (phase mediator) were thoroughly dried and then kneaded together in various weight ratios under an argon atmosphere using the laboratory compounder, and were then ground. The ground products were thoroughly dried and used to measure the flowabilities, the values of which are given in the following table.

| COC A2 [% by weight] | HDPE B1 [% by weight] | COC C2 [% by weight] | MVI 21,6 kg/ 250° C. [cm³/10 min] |
|---|---|---|---|
| 100 | — | — | 11,5 |
| 42,9 | 47,1 | 10/e | 43,5 |
| 42,9 | 57,1 | — | 45,5 |
| 81,1 | — | 18,9/e | 23,5 |
| — | 82,5 | 17,5/e | 57,3 |
| 35,8 | 44,2 | 20/e | 42,3 |
| 35,8 | 64,2 | — | 44,6 |
| 64,2 | — | 35,8/e | 38,3 |
| 28,7 | 41,3 | 30/e | 41,4 |
| 28,7 | 71,3 | — | 55,0 |
| — | 100 | — | 81,5 |
| — | — | 100 | 98,1 |

The tests identified with an "e" are according to the invention, the remainder being comparative tests.

EXAMPLE 6

The cycloolefin copolymer A2, the polethylene B1 and, in some cases, the cycloolefin block copolymer C2 (phase mediator) were thoroughly dried and then kneaded together in various weight ratios under an argon atmosphere using the laboratory compounder, and were then ground. The ground products were thoroughly dried and then press-molded into sheets. The following table shows the mechanical data of the blends measured in the tensile test.

| COC A2 [wt.-%] | HDPE B1 [wt.-%] | COC C2 [wt.-%] | E-Modul [GPa] | Yield Stress [MPa] | elongation at break [%] |
|---|---|---|---|---|---|
| 100 | — | — | 3,3 | 58 | 5 |
| 42,9 | 47,1 | 10/e | 2,6 | 52 | 40 |
| 42,9 | 57,1 | — | 2,6 | 51 | 9 |
| 81,1 | — | 18,9/e | 3,1 | 56 | 7 |
| — | 82,5 | 17,5/e | 0,9 | 28 | 448 |
| 35,8 | 44,2 | 20/e | 2,5 | 47 | 101 |
| 35,8 | 64,2 | — | 2,6 | 48 | 13 |
| 64,2 | — | 35,8/e | 2,8 | 53 | 27 |
| 28,7 | 41,3 | 30/e | 1,1 | 31 | 146 |
| 28,7 | 71,3 | — | 1,5 | 40 | 24 |
| — | 100 | — | 1,2 | 27 | 658 |
| — | — | 100 | 0,4 | 31 | 401 |

The tests identified with an "e" are according to the invention, the remainder being comparative tests.

EXAMPLE 7

The cycloolefin copolymer A2, the polyethylene B1 and, in some cases, the cycloolefin block copolymer C2 (phase mediator) were thoroughly dried and then kneaded together in various weight ratios under an argon atmosphere using the laboratory compounder, and were then ground. The ground products were thoroughly dried and then press-molded into sheets. The following table shows the mechanical data of the blends measured in the torsion pendulum test.

EXAMPLE 10

The cycloolefin copolymer A3, the polyethylene B2 and, in some cases, the cycloolefin block copolymer C3 (phase mediator) were thoroughly dried and then extruded in various weight ratios under an argon atmo-

| COC A2 [% by weight] | HDPE B1 [% by weight] | COC C2 [% by weight] | Shear modulus G' (torsion pendulum) [N/mm$^2$] Temperature [°C.] | | | | | | | | | | | |
|---|---|---|---|---|---|---|---|---|---|---|---|---|---|---|
| | | | −160 | −80 | −40 | 0 | 20 | 30 | 60 | 90 | 120 | 140 | 160 |
| 100 | — | — | 1684 | 1299 | 1236 | 1187 | 1163 | 1151 | 1107 | 1059 | 1012 | 981 | 935 |
| 42,9 | 47,1 | 10/e | 2053 | 1158 | 1059 | 948 | 819 | 689 | 433 | 274 | 143 | 43 | 37 |
| 42,9 | 57,1 | — | 2178 | 1216 | 1085 | 944 | 833 | 770 | 528 | 341 | 156 | 19 | 17 |
| 81,1 | — | 18,8/e | 1565 | 1096 | 1046 | 1002 | 892 | 830 | 769 | 723 | 678 | 641 | 582 |
| — | 82,5 | 17,5/e | 2547 | 1157 | 1019 | 861 | 686 | 483 | 223 | 104 | 28 | — | — |
| — | 100 | — | 2517 | 1141 | 980 | 813 | 677 | 596 | 312 | 136 | 35 | — | — |
| — | — | 100 | 1918 | 771 | 728 | 674 | 492 | 23 | — | — | — | — | — |

The tests identified an "e" are according to the invention, the remainder being comparative tests.

EXAMPLE 8

The cycloolefin copolymer A3, the polyethylene B2 and, in some cases, the cycloolefin block copolymer C3 (phase mediator) were thoroughly dried and then extruded together in various weight ratios under an argon atmosphere using a twin-screw extruder, and were then granulated. The following table shows the measured thermal properties of the blends.

sphere using a twin-screw extruder, and were then granulated. The granulated material was thoroughly dried and injection-molded into large dumbbell-shaped test pieces. The following table shows the measured ball indentation hardnesses.

| COC A3 [wt.-%] | HDPE B2 [wt.-%] | COC C3 [wt.-%] | Cooling | | 2nd Heating | | | | |
|---|---|---|---|---|---|---|---|---|---|
| | | | Tm HDPE B2 [°C.] | dHm HDPE B2 [J/g] | Tm HDPE B2 [°C.] | dHm HDPE B2 [J/g] | Tg COC A3 [°C.] | Tg$_1$ COC C3 [°C.] | Tg$_2$ COC C3 [°C.] |
| 100 | — | — | — | — | — | — | 151 | — | — |
| 70 | 20 | 10 | 75° | 32,9* | 131 | 24,2 | 151 | + | + |
| 70 | 30 | — | 111° | 63,1* | 133 | 56,4 | 151 | — | — |
| 87,5 | — | 12,5 | — | — | — | — | 147 | + | + |
| — | 100 | — | 113 | 223,9 | 137 | 216,9 | — | — | — |
| — | — | 100 | — | — | — | — | — | 30 | 108 |

Heating-up and cooling rate: 20°/min
*Tm and Tg not separated
+ not measurable (equipment sensitivity too low)
°maximum peak (several peaks)

EXAMPLE 9

The cycloolefin copolymer A3, the polyethylene B2 and, in some cases, the cycloolefin block copolymer C3 (phase mediator) were thoroughly dried and then extruded together in various weight ratios under an argon atmosphere using a twin-screw extruder, and were then granulated. The granulated material was thoroughly dried and used to measure the flowabilities, the values of which are given in the following table.

| COC A3 [wt.-%] | HDPE B2 [wt.-%] | COC C3 [wt.-%] | MVI 5 kg/220° C. [cm$^3$/10 min] |
|---|---|---|---|
| 100 | — | — | 1,4 |
| 70 | 20 | 10/e | 4,1 |
| 70 | 30 | — | 8,7 |
| 87,5 | — | 12,5/e | 1,5 |
| — | 100 | — | 12,0 |
| — | — | 100 | 4,2 |

The tests identified with an "e" are according to the invention, the remainder being comparative tests.

| COC A3 | HDPE B2 | COC C3 | indendation hardness [N/mm$^2$] |
|---|---|---|---|
| 100 | — | — | 182[a] |
| 70 | 20 | 10/e | 122[b] |
| 70 | 30 | — | 112[b] |
| 87,5 | — | 12,5/e | 180[a] |
| — | 100 | — | 50[c] |
| — | — | 100 | 142[b] |

The tests identified with an "e" are according to the invention, the remainder being comparative tests.

| Test force: | [a]961N |
|---|---|
| | [b]358N |
| | [c]132N |

EXAMPLE 11

The cycloolefin copolymer A3, the polyethylene B2 and, in some cases, the cycloolefin block copolymer C3 (phase mediator) were thoroughly dried and then extruded together in various weight ratios under an argon atmosphere using a twin-screw extruder, and were then granulated. The granulated material was thoroughly dried and then injection-molded into small standard test pieces. The following table shows the measured impact strengths.

| HDPE | | | impact Strength | | | |
|---|---|---|---|---|---|---|
| COC A3 | B2 | COC C3 | [J/m] | | [kJ/m$^2$] | |
| [wt.-%] | [wt.-%] | [wt.-%] | 25° C. | 60° C. | 25° C. | 60° C. |
| 100 | — | — | 35,2 | 35,0 | 5,9 | 5,8 |
| 70 | 20 | 10/e | 128,4 | 153,2 | 21,0 | 25,2 |
| 70 | 30 | — | 36,3 | 33,8 | 6,0 | 5,6 |
| 87,5 | — | 12,5/e | 78,6 | 123,3 | 12,9 | 20,2 |
| — | 100 | — | o.Br. | o.Br. | o.Br. | o.Br. |

The tests identified with an "e" are according to the invention, the remainder being comparative tests.

EXAMPLE 12

The cycloolefin copolymer A5, the polyethylene B3, the polyethylene B4 (GUR) and, in some cases, the cycloolefin block copolymer C4 (phase mediator) were thoroughly dried and then extruded together in various weight ratios under an argon atmosphere using a twin-screw extruder, and were then granulated. The following table shows the measured thermal properties of the blends.

| | | | | Cooling | | 2nd Heating | | | | |
|---|---|---|---|---|---|---|---|---|---|---|
| COC A5 | HDPE B3 | GUR/ HDPE B4 | COC C4 | Tm HDPE | dHm HDPE | Tm HDPE | dHm HDPE | Tg COC A5 | Tg1 COC C4 | Tg2 COC C4 |
| [wt.-%] | [wt.-%] | [wt.-%] | [wt.-%] | [°C.] | [J/g] | [°C.] | [J/g] | [°C.] | [C.°] | [°C.] |
| 100 | — | — | — | — | — | — | — | 178,1 | — | — |
| 70 | 10 | 10 | 10 | 113,5 | 36,3 | 128,5 | 37,3 | 177,2 | —+ | 152,7 |
| 70 | 15 | 15 | — | 110,1 | 51,1 | 132,4 | 51,1 | 177,9 | — | — |
| — | 33,3 | 33,3 | 33,3 | 111,8 | 118,8 | 133,1 | 118,5 | — | −13,8 | 153,8 |
| — | — | — | 100 | — | — | — | — | — | −11,5 | 150,8 |
| — | — | 100 | — | 115,4 | 160,0 | 135,7 | 167,2 | — | — | — |
| — | 100 | — | — | 111,2 | 185,0 | 132,3 | 191,5 | — | — | — |

Heating-up and cooling rates: 20°/minute
+ not measurable (apparatus sensitivity too low)

EXAMPLE 13

The cycloolefin copolymer A5, the polyethylene B3, the polyethylene B4 (GUR) and, in some cases, the cycloolefin block copolymer C4 (phase mediator) were thoroughly dried and then extruded in various weight ratios under an argon atmosphere using a twin-screw extruder, and were then granulated. The granulated material was thoroughly dried and then injection-molded into large dumbbell-shaped test pieces. The following table shows the measured heat distortion temperatures.

| COC A5 [wt.-%] | HDPE B3 [wt.-%] | HDPE B4 GUR [wt.-%] | COC C4 [wt.-%] | HDT-(A/B) [°C.] |
|---|---|---|---|---|
| 100 | — | — | — | 153 (A) |
| 70 | 10 | 10 | 10/e | 159 (B) |
| 70 | 15 | 15 | — | 157 (B) |
| — | 33,3 | 33,3 | 33,3/e | 40 (B) |
| — | — | — | 100 | too soft |

| COC A5 [wt.-%] | HDPE B3 [wt.-%] | HDPE B4 GUR [wt.-%] | COC C4 [wt.-%] | HDT-(A/B) [°C.] |
|---|---|---|---|---|
| — | — | 100 | — | — |
| — | 100 | — | — | 59 (B) |

The tests identified with an "e" are according to the invention, the remainder being comparative tests.

EXAMPLE 14

The cycloolefin copolymer A5, the polyethylene B3, the polyethylene B4 and, in some cases, the cycloolefin block copolymer C4 (phase mediator) were thoroughly dried and then extruded together in various weight ratios under an argon atmosphere using a twin-screw extruder, and were then granulated. The granulated material was thoroughly dried and then injection-molded into large dumbbell-shaped test pieces. The following table shows the measured notched impact strengths.

Izod-notched

| COC A5 [wt.-%] | HDPE B3 [wt.-%] | HDPE B4 GUR [% by weight] | COC C4 [wt.-%] | impact Strength [J/m] |
|---|---|---|---|---|
| 100 | — | — | — | 18 |
| 70 | 10 | 10 | 10/e | 36 |
| 70 | 15 | 15 | — | 26 |
| — | 33,3 | 33,3 | 33,3/e | 480 |
| — | — | — | 100 | o.Br. |
| — | — | 100 | — | o.Br. |
| — | 100 | — | — | 460 |

OBr.: without fracture

The tests identified with an "e" are according to the invention, the remainder being comparative tests.

EXAMPLE 15

The cycloolefin copolymer A4, the polypropylene B5 and, in some cases, the cycloolefin block copolymer C4 (phase mediator) were thoroughly dried and then extruded together in various weight ratios under an argon atmosphere using a twin-screw extruder, and were then granulated. The following table shows the measured thermal properties of the blends.

| | | | Cooling | | 2nd Heating | | | | |
|---|---|---|---|---|---|---|---|---|---|
| COC A4 | iPP B5 | COC C4 | Tm iPP B5 | dHm iPP B5 | Tm iPP B5 | dHm iPP B5 | Tg COC A4 | Tg1 COC C4 | Tg2 COC C4 |
| [wt.-%] | [wt.-%] | [wt.-%] | [°C.] | [J/g] | [°C.] | [J/g] | [°C.] | [C.°] | [°C.] |
| 100 | — | — | — | — | — | — | 151,7 | — | — |
| 60 | 30 | 10 | 108,3 | 20,8 | 159,4° | 21,2° | —° | —+ | —□ |

-continued

| COC A4 [wt.-%] | iPP B5 [wt.-%] | COC C4 [wt.-%] | Cooling Tm iPP B5 [°C.] | Cooling dHm iPP B5 [J/g] | 2nd Heating Tm iPP B5 [°C.] | 2nd Heating dHm iPP B5 [J/g] | Tg COC A4 [°C.] | $Tg_1$ COC C4 [C.°] | $Tg_2$ COC C4 [°C.] |
|---|---|---|---|---|---|---|---|---|---|
| 60 | 40 | — | 110,1 | 37,0 | 159,8° | 34,7° | —° | — | — |
| 85,7 | — | 14,3 | — | — | — | — | 149,0 | —+ | —* |
| — | 75 | 25 | 110,8 | 66,9 | 160,8° | 71,3° | — | —+ | —□ |
| 70 | 20 | 10 | 105,6 | 14,4 | 159,5° | 15,4° | —° | —+ | —□ |
| — | — | 100 | — | — | — | — | — | −11,5 | 150,8 |
| — | 100 | — | 113,5 | 95,5 | 161,5 | 101,4 | — | — | — |
| 30 | 60 | 10 | 109,8 | 55,8 | 161,5° | 57,6° | —° | −11,9 | —□ |
| 30 | 70 | — | 111,0 | 65,4 | 161,7° | 64,7° | —° | — | — |
| — | 85,7 | 14,3 | 110,7 | 79,1 | 161,1 | 81,4 | — | −10,6 | —□ |
| 75 | — | 25 | — | — | — | — | 148,4 | —+ | —* |
| 20 | 70 | 10 | 111,4 | 61,0 | 162,3° | 63,3° | —° | −9,4 | —□ |

Heating-up and cooling rate: 20°/minute
+not measurable (apparatus sensitivity too low)
*$Tg_2$ (COC C4) less than Tg (COC A4)
°Tg (COC A4) less than Tm (iPP B5)
□$Tg_2$ (COC C5) less than Tm (iPP B5)

EXAMPLE 16

The cycloolefin copolymer A4, the polypropylene B5 and, in some cases, the cycloolefin block copolymer C4 (phase mediator) were thoroughly dried and then extruded together in various weight ratios under an argon atmosphere using a twin-screw extruder and were then granulated. The granulated material was thoroughly dried and used to measure the flowabilities, the values of which are given in the following table.

| COC A4 [wt.-%] | iPP B5 [wt.-%] | COC C4 [wt.-%] | MVI [ccm/10 min] |
|---|---|---|---|
| 100 | — | — | 1,8 |
| 60 | 30 | 10/e | 7,0 |
| 60 | 40 | — | 7,5 |
| 85,7 | — | 14,3/e | 3,3 |
| — | 75 | 25/e | 13 |
| 70 | 20 | 10/e | 5,6 |
| — | — | 100 | 20 |
| — | 100 | — | 6,3 |
| 30 | 60 | 10/e | 11 |
| 30 | 70 | — | 11 |
| — | 85,7 | 14,3/e | 11 |
| 75 | — | 25/e | 4,5 |
| 20 | 70 | 10/e | 12 |

Temperature and loading weight: 230° C./10 kg The tests identified with an "e" are according to the invention, the remainder being comparative tests.

EXAMPLE 17

The cycloolefin copolymer A4, the polypropylene B5 and, in some cases, the cycloolefin block copolymer C4 (phase mediator) were thoroughly dried and then extruded together in various weight ratios in an argon atmosphere using a twin-screw extruder and were then granulated. The granulated material was thoroughly dried and then press-molded into sheets. The following table shows the mechanical data of the blends measured in the torsion pendulum test.

The tests identified with an "e" are according to the invention, the remainder being comparative tests.

| COC A4 [wt.-%] | iPP B5 [% by weight] | COC C4 [wt.-%] | Shear modulus G' (torsion pendulum) [N/mm²] Temperature [°C.] −150 | −100 | −80 | −20 | 0 | 40 | 80 | 100 | 140 |
|---|---|---|---|---|---|---|---|---|---|---|---|
| 100 | — | — | 1707 | 1416 | 1346 | 1274 | 1257 | 1193 | 1129 | 1095 | 967 |
| 60 | 30 | 10/e | 1792 | 1415 | 1343 | 1183 | 969 | 632 | 516 | 476 | 382 |
| 60 | 40 | — | 1905 | 1601 | 1520 | 1314 | 1150 | 792 | 621 | 569 | 445 |
| 85,7 | — | 14,3/e | 1584 | 1173 | 1109 | 994 | 911 | 644 | 781 | 752 | 665 |
| — | 75 | 25/e | 2132 | 1715 | 1607 | 1302 | 876 | 317 | 142 | 100 | 35 |
| 70 | 20 | 10/e | 1761 | 1400 | 1317 | 1167 | 1022 | 746 | 631 | 595 | 495 |
| — | — | 100 | 1725 | 807 | 712 | 593 | — | — | — | — | — |
| — | 100 | — | 2331 | 2119 | 2023 | 1648 | 1336 | 498 | 225 | 159 | 53 |
| 30 | 60 | 10/e | 2067 | 1718 | 1624 | 1377 | 1059 | 532 | 275 | 209 | 86 |
| 30 | 70 | — | 2002 | 1724 | 1646 | 1380 | 1165 | 596 | 342 | 266 | 113 |
| — | 85,7 | 14,3/e | 2241 | 1899 | 1788 | 1455 | 1074 | 393 | 177 | 123 | 42 |
| 75 | — | 25/e | 1610 | 1113 | 1039 | 934 | 768 | 673 | 617 | 588 | 493 |
| 20 | 70 | 10/e | 2101 | 1779 | 1688 | 1405 | 1076 | 475 | 234 | 175 | 63 |

EXAMPLE 18

The cycloolefin copolymer A4, the polypropylene B5 and, in some cases, the cycloolefin block copolymer C4 (phase mediator) were thoroughly dried and then extruded together in various weight ratios under an argon atmosphere using a twin-screw extruder and were then granulated. The granulated material was thoroughly dried and then injection-molded into large dumbbell-shaped test pieces. The following table shows the measured Izod notched impact strengths and elongations at break.

| COC A4 [wt.-%] | iPP B5 [wt.-%] | COC C4 [wt.-%] | Izod notched impact strength [J/m] | Izod notched impact strength [IJ/m²] | elongation at break [%] |
|---|---|---|---|---|---|
| 100 | — | — | 17 | 2,1 | 3,6 |

-continued

| COC A4 [wt.-%] | iPP B5 [wt.-%] | COC C4 [wt.-%] | Izod notched impact strength [J/m] | | elongation at break [%] |
|---|---|---|---|---|---|
| | | | [J/m] | [IJ/m²] | |
| 60 | 30 | 10/e | 30 | 3,8 | 24 |
| 60 | 40 | — | 15 | 1,9 | 3,6 |
| 85,7 | — | 14,3/e | 35 | 4,4 | 31 |
| — | 75 | 25/e | n.g. | n.g. | 362* |
| 70 | 20 | 10/e | 19 | 2,4 | 4,6 |
| — | — | 100 | o.Br. | o.Br. | >75 |
| — | 100 | — | 65 | 8,1 | 500* |
| 30 | 60 | 10/e | 26 | 3,2 | 20* |
| 30 | 70 | — | 23 | 2,9 | 8,8 |
| — | 85,7 | 14,3/e | 414 | 52 | 52 |
| 75 | — | 25/e | 48 | 6,0 | 41 |
| 20 | 70 | 10/e | 49 | 6,2 | 51* |

The tests identified with an "e" are according to the invention, the remainder being comparative tests.

What is claimed is:

1. A process for preparing a polymer blend comprising (i) combining at least one of (A) a finely particulate cycloolefin polymer, and (B) a finely particulate polyolefin, with (C) at least one block copolymer, to form a mixture; and (ii) processing the mixture at an elevated temperature, under the action of shear forces, to form the polymer blend, wherein:

in the polymer blend, (A) is present in an amount of 0 to 95 parts by weight, (B) is present in an amount of 0 to 95 parts by weight, (C) is present in an amount of 0.1 to 99 parts by weight and, the sum of the amounts of (A), (B) and (C) present is 100 parts by weight;

the finely particulate cycloolefin polymer (A) comprises at least one monomer of formula I, II, III, IV, V and VI and at least one monomer of formula VII and VIII, but said cycloolefin polymer is not a block copolymer;

the block copolymer (C) is obtained by polymerizing:
a) 0.1 to 95% by weight, with respect to the total amount of monomers employed, of at least one monomer of the formula I, II, III, IV, V and VI,
b) 0 to 95% by weight, with respect to the total amount of monomers employed, of a cycloolefin of the formula VII, and
c) 0 to 99% by weight, with respect to the total amount of monomers employed, of at least one acyclic olefin of the formula VIII, at a temperature of −78° to 150° C. and a pressure 0.01 to 64 bar, in the presence of a catalyst comprising a cocatalyst and a metallocene, and at a molecular weight distribution $M_w/M_n$ of less than 2, always with respect to the polymer block forming, the reaction conditions are changed one or more times in such a way that the monomer/comonomer ratio changes by at least 10% or a further polymerizable monomer of the formulae I–VIII is metered into the monomer or the monomers; and the monomers of the formula I, II, III, IV, V, VI, VII and VIII are:

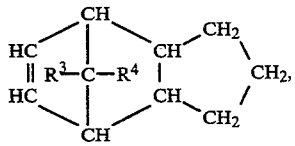
(I)

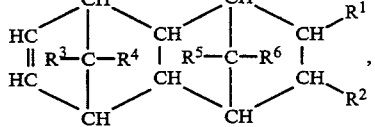
(II)

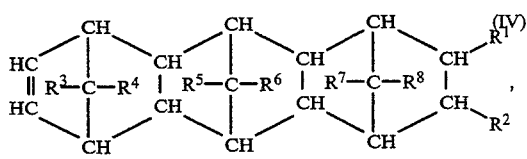
(III)

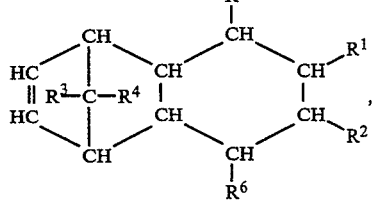
(IV)

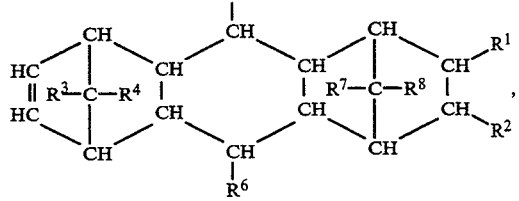
(V)

(VI)

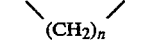
(VII)

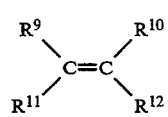
(VIII)

in which $R^1$, $R^2$, $R^3$, $R^4$, $R^5$, $R^6$, $R^7$, $R^8$, $R^9$, $R^{10}$, $R^{11}$, and $R^{12}$ are identical or different and are a hydrogen atom or a $C_1$–$C_8$-alkyl radical and n is a number from 2 to 10.

2. The process as claimed in claim 1, wherein component (B) of the blend includes aliphatic poly-1-olefin.

3. The process as claimed in claim 1 wherein component (B) of the blend includes polyethylene.

4. The process of claim 1, wherein additives are added to the mixture.

5. The process as claimed in claim 2, wherein from 1 to 55 parts by weight of at least one block polymer, from 10 to 80 parts by weight of polyolefin or polyolefins and from 10 to 80 parts by weight of cycloolefin polymer or polymers are combined and processed, with the proviso that the sum of the polymers totals 100 parts by weight.

6. The process as claimed in claim 2, wherein a weight ratio of polyolefin or polyolefins to block copolymer or block copolymers of at least 1:1 is maintained.

7. The process as claimed in claim 3, wherein from 0 to 50 parts by weight of a finely particulate polyethylene or several finely particulate polyethylenes are used.

8. The process as claimed in claim 3, wherein the polyethylene is HDPE.

9. The process as claimed in claim 1, wherein in the polymerization a metallocene of the formula XI is used

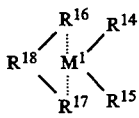 (XI)

where

M$^1$ is titanium, zirconium, hafnium, vanadium, niobium or tantalum,

R$^{14}$ and R$^{15}$ are the same or different and are a hydrogen atom, a halogen atom, a C$_1$-C$_{10}$-alkyl group, a C$_1$-C$_{10}$-alkoxy group, a C$_6$-C$_{10}$-aryl group, a C$_6$-C$_{10}$-aryloxy group, a C$_2$-C$_{10}$-alkenyl group, a C$_7$-C$_{40}$-arylalkyl group, a C$_7$-C$_{40}$-alkylaryl group or a C$_8$-C$_{40}$-arylalkenyl group, R$^{16}$ and R$^{17}$ are a mononuclear or polynuclear hydrocarbon radical which together with the central atom M$^1$ can form a sandwich structure, R$^{18}$ is

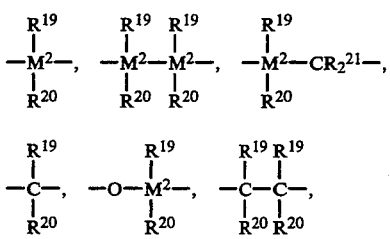

$=$BR$^{19}$, $=$AlR$^{19}$, —Ge—, —Sn—, —O—, —S—, $=$SO, $=$SO$_2$, $=$NR$^{19}$, $=$CO, $=$PR$^{19}$, or $=$P(O)R$^{19}$, where R$^{19}$, R$^{20}$ and R$^{21}$ are the same or different and are a hydrogen atom, a halogen atom, a C$_1$-C$_{10}$-alkyl group, a C$_1$-C$_{10}$-fluoroalkyl group, a C$_6$-C$_{10}$-fluoroaryl group, a C$_6$-C$_{10}$-aryl group, a C$_1$-C$_{10}$-alkoxy group, a C$_2$-C$_{10}$-alkenyl group, a C$_7$-C$_{40}$-arylalkyl group, a C$_8$-C$_{40}$-arylalkenyl group or a C$_7$-C$_{40}$-alkylaryl group, or R$^{19}$ and R$^{20}$ or R$^{19}$ and R$^{21}$ in each case form a ring with the atoms that connect them, and M$^2$ is silicon, germanium or tin.

10. A polymer blend produced by the process of claim 1.

11. A matrix material comprising the polymer blend of claim 10.

12. The process as claimed in claim 1 wherein component (B) of the blend includes polypropylene.

13. The process as claimed in claim 12, wherein the polypropylene is finely particulate isotactic polypropylene.

14. A composite comprising the matrix of claim 11.

15. A molding comprising the matrix of claim 11.

16. A process as recited in claim 1, wherein the catalyst comprises an aluminoxane of the formula (IX)

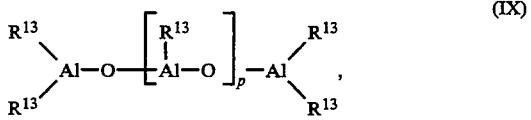 (IX)

for the linear type and/or of the formula (X)

 (X)

for the cyclic type, where, in the formulae (IX) and (X), the radicals R$^{13}$ are identical different and are a C$_1$-C$_6$-alkyl group, a C$_6$-C$_{18}$-aryl group, benzyl or hydrogen, and p is an integer from 2 to 50, and a metallocene of the formula XI

 (XI)

in which

M$^1$ is titanium, zirconium, hafnium, vanadium, niobium or tantalum,

R$^{14}$ and R$^{15}$ are identical or different and are a hydrogen atom, a halogen atom, a C$_1$-C$_{10}$-alkyl group, a C$_6$-C$_{10}$-alkoxy group, a C$_6$-C$_{10}$aryl group, a C$_6$-C$_{10}$-aryloxy group, a C$_2$-C$_{10}$-alkenyl group, a C$_7$-C$_{40}$-arylalkyl group, a C$_7$-C$_{40}$-alkyl aryl group or a C$_8$-C$_{40}$-arylalkenyl group, R$^{16}$ and R$^{17}$ are a mononuclear or polynuclear hydrocarbon radical which can form a sandwich structure with the central atom M$^1$, R$^{18}$ is

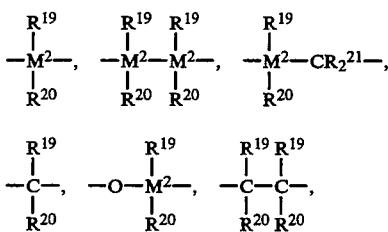

$=$BR$^{19}$, $=$AlR$^{19}$, —Ge—, —Sn—, —O—, —S—, $=$SO, $=$SO$_2$, $=$NR$^{19}$, $=$CO, $=$PR$^{19}$ or $=$P(O)R$^{19}$, where R$^{19}$, R$^{20}$ and R$^{21}$ are identical or different and are a hydrogen atom, a halogen atom, a C$_1$-C$_{10}$-alkyl group, a C$_1$-C$_{10}$-fluoroalkyl group, a C$_6$-C$_{10}$-aryl group, a C$_1$-C$_{10}$-alkoxy group, a C$_2$-C$_{10}$-alkenyl group, a C$_7$-C$_{40}$-arylalkyl group, a C$_8$-C$_{40}$-arylalkenyl group or a C$_7$-C$_{40}$-alkylaryl group, or R$^{19}$ and R$^{20}$, or R$^{19}$ and R$^{21}$, form a ring, in each case together with the atoms linking them, and M$^2$ is silicon, germanium or tin.

17. The process of claim 1 wherein component (A) of the blend includes at least one acyclic olefin of formula VIII.

* * * * *